US008078116B2

(12) United States Patent
Houllier et al.

(10) Patent No.: US 8,078,116 B2
(45) Date of Patent: Dec. 13, 2011

(54) METHOD OF ANALYZING THE OPERATION OF A CELLULAR MOBILE TELECOMMUNICATIONS NETWORK

(75) Inventors: Jean-Roch Houllier, Saint-Michel sur Orge (FR); Alain Brethereau, Viroflay (FR); Béatrix De Mathan, Paris (FR); Andrë Mechaly, Saint Maur des Fosses (FR)

(73) Assignee: Alcatel Lucent, Paris (FR)

( * ) Notice: Subject to any disclaimer, the term of this patent is extended or adjusted under 35 U.S.C. 154(b) by 895 days.

(21) Appl. No.: 11/376,085

(22) Filed: Mar. 16, 2006

(65) Prior Publication Data
US 2006/0223523 A1    Oct. 5, 2006

(30) Foreign Application Priority Data

Mar. 17, 2005  (FR) ..................................... 05 50689

(51) Int. Cl.
*H04B 17/00*   (2006.01)
(52) U.S. Cl. .................... 455/67.7; 455/435.2; 455/423; 455/446; 455/67.11
(58) Field of Classification Search ............... 455/435.2, 455/423, 446, 67.11, 67.7
See application file for complete search history.

(56) References Cited

U.S. PATENT DOCUMENTS

| 5,179,722 | A | 1/1993 | Gunmar et al. |
| 5,561,841 | A | 10/1996 | Markus et al. |
| 2003/0064730 | A1* | 4/2003 | Chen et al. ..................... 455/453 |
| 2003/0100299 | A1* | 5/2003 | Ko et al. ......................... 455/423 |
| 2004/0246940 | A1* | 12/2004 | Kubler et al. ................. 370/351 |
| 2005/0249342 | A1* | 11/2005 | Griffiths ................... 379/121.04 |

FOREIGN PATENT DOCUMENTS

| EP | 0 431 956 A | 6/1991 |
| WO | WO 02/43026 A | 5/2002 |

* cited by examiner

*Primary Examiner* — Patrick Edouard
*Assistant Examiner* — Justin Lee
(74) *Attorney, Agent, or Firm* — Fay Sharpe, LLP

(57) ABSTRACT

The method analyzes the operation of a cellular mobile telecommunications network comprising a set of cells each associated with a base station adapted to communicate with a mobile station present in the cell.
The method comprises:
  a) for each cell, collecting one or more variables characteristic of the operation of the network in said cell; and
  b) supplying the or each characteristic variable in association with the collection cell.
The supply step comprises:
  b1) selecting on a map of the network based on said cells an observation line passing over the map across adjacent cells; and
  b2) making available a structured representation of the or each characteristic variable for only the adjacent cells crossed by said observation line, in the order in which they are encountered along said line.

18 Claims, 4 Drawing Sheets

METHOD OF ANALYZING THE OPERATION OF A CELLULAR MOBILE TELECOMMUNICATIONS NETWORK

CROSS-REFERENCES

The application claims the benefit of French Application No. 0550689, filed Mar. 17, 2005.

BACKGROUND

The present invention relates to a method of analyzing the operation of a cellular mobile telecommunications network comprising a set of cells each associated with a base station adapted to communicate with a mobile station present in the cell, the method comprising the following steps:

a) for each cell, collecting one or more variables characteristic of the operation of the network in said cell; and b) supplying the or each characteristic variable in association with the collection cell.

Using workstations to display a two-dimensional map of the coverage area of a mobile telecommunications network to optimize the operation of the network is known in the art.

To this end, the workstation includes a database containing the real location in the coverage area of each base station. Each base station is associated with a cell defining a region within which mobile stations can communicate with that station. This is known in art.

For each cell, the database periodically receives one or more variables characteristic of the operation of the network in that cell.

The values of these characteristic variables are preferably known at a plurality of successive times for the same cell.

The representation of the network displayed on the base station includes a representation of each cell of the network. One or more characteristic variables of each cell is shown graphically, for example by means of different colors and/or textures representing the values of the characteristic variables on a predefined color and/or texture scale. Thus, by simple visual examination of the representation of the network, a user is able to analyze the simultaneous operating states of a large number of cells at a given time and thereby to detect certain malfunctions of the network for subsequently optimizing the network configuration.

In practice, because of the difficulty of interpreting the very large number of characteristic variables and the very large number of cells included in the representation, analyzing these representations of a network proves to be relatively complicated.

SUMMARY

An object of the invention is to propose a method and a workstation for analyzing the operation of a telecommunications network that facilitate the work of operators configuring and/or optimizing the network. To this end, the invention consists in a method of the above-specified type for analyzing the operation of a cellular mobile telecommunications network, characterized in that the supply step comprises:

b1) selecting on a map of the network based on said cells an observation line passing over the map across adjacent cells; and b2) making available a structured representation of the or each characteristic variable for only the adjacent cells crossed by said observation line, in the order in which they are encountered along said line.

Particular implementations of the method have one or more of the following features:

each cell is a polygon derived from a Voronoï polygon defined as a representation in the dual space of the subdivision of the coverage area of the network by Delaunay triangulation based on the layout of the base stations;

two or more characteristic variables are collected for each cell and made available simultaneously in the same structured representation;

the collection step includes a step of sampling the characteristic variable(s) over time and the making available step includes a step of making successively available the same structured representation of the or each characteristic variable at successive sampling times;

said structured representation includes a bidimensional graphic one dimension whereof represents adjacent cells of said line and the other dimension whereof represents the or each characteristic variable;

said structured representation is a histogram; and the collection step includes a step of sampling the or each characteristic variable over time and the method includes a step of selecting a single analysis cell and a step of making a structured representation of the evolution over time one or more characteristic variables available for only the selected analysis cell.

The invention further consists in a workstation for analyzing the operation of a cellular mobile telecommunications network comprising a set of cells each associated with a base station adapted to communicate with a mobile station present in the cell, the workstation including:

a) collector means for collecting, for each cell, one or more variables characteristic of the operation of the network in said cell; and b) supply means for supplying the or each characteristic variable in association with the collection cell, the workstation being characterized in that the supply means comprise:

b1) means for selecting on a map of the network based on said cells an observation line passing over the map across adjacent cells; and b2) means for making available a structured representation of the or each characteristic variable for only the adjacent cells crossed by said observation line, in the order in which they are encountered along said line.

The invention finally consists in a computer program product for a workstation including means for making available information including a set of instructions for executing steps of the method when said program is executed by a workstation.

DESCRIPTION OF DRAWINGS

The invention can be better understood after reading the following description, which is given by way of example only and with reference to the appended drawings, in which.

DETAILED DESCRIPTION

Figure 1:
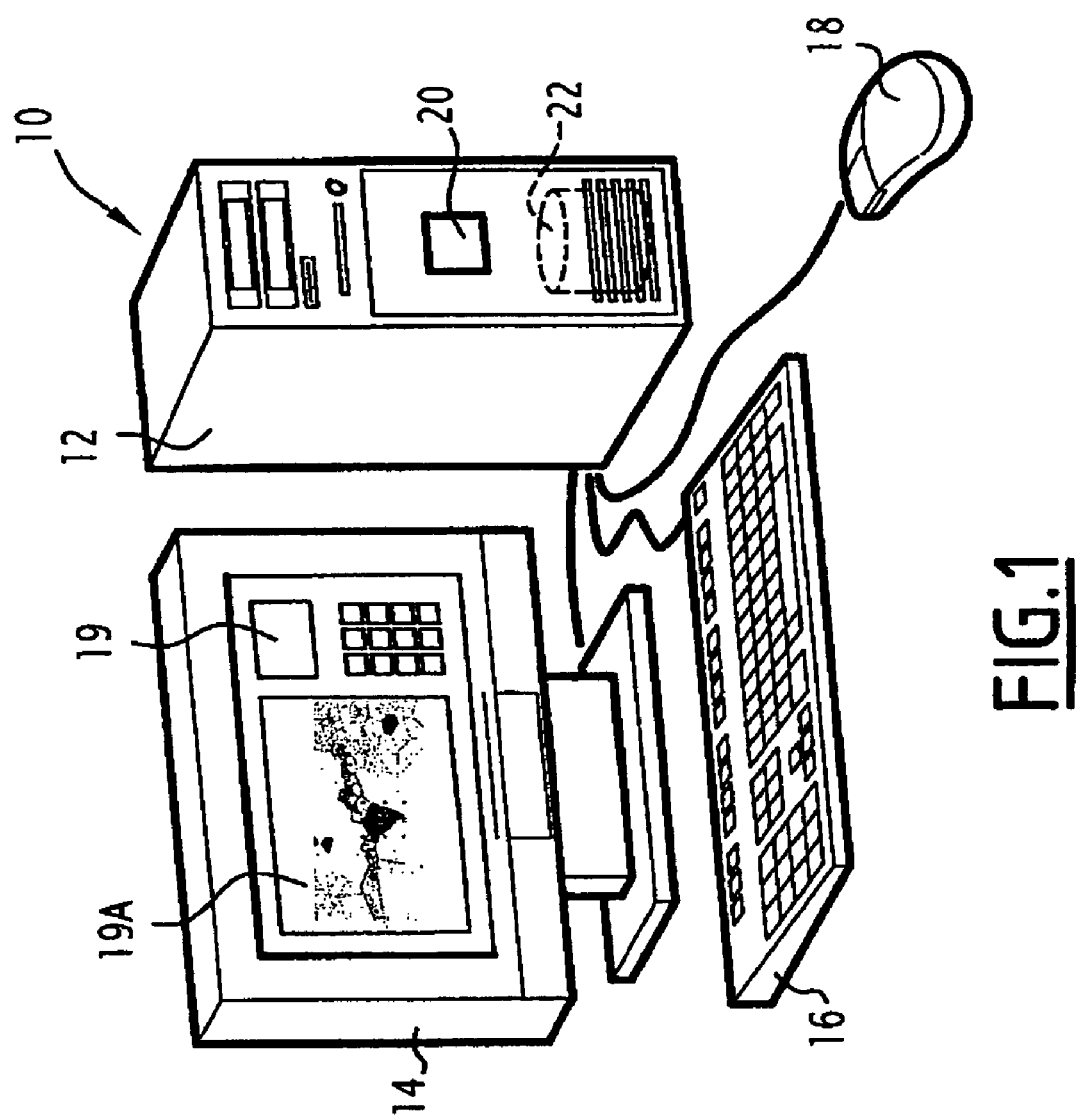
FIG. 1 is a diagrammatic perspective view of a workstation of the invention.

The workstation 10 shown in FIG. 1 is for analyzing the operation of and optimizing a cellular mobile telecommunications network.

The workstation uses appropriate software to display a map representing the mobile telephone network concerned. This is known in the art.

Accordingly, the station comprises a central data processing unit 12, a display screen 14 and means forming a man/machine interface such as a keyboard 16 and/or a mouse 18 for selecting functions from a graphical user interface 19 displayed on the screen 14. The interfaces are adapted in particular to provide for the selection of graphical elements on the display and selecting an observation line on the map.

The data processing unit 12 comprises a processor 20 for executing a computer program for processing data and controlling the display on the screen 14, in particular on the basis of information received from the keyboard 16 and/or the mouse 18.

The unit 12 further comprises data storage means 22 such as a hard disk on which are stored a description of a map of the network and a program executed by the workstation.

The stored description of a map of the network includes in particular the position of the base stations installed in the territory that are adapted to communicate with the mobile stations.

A cell is defined for each base station. This is known in the art. It corresponds to the region within which each mobile station communicates with the corresponding base station. The contour of each cell depends on the configuration of the network and in particular on the configuration of the base stations.

Each cell is preferably defined graphically by a "Voronoï" polygon constituting a representation in the dual space of the distribution of the coverage area of the network obtained by Delaunay triangulation based on the locations of the base stations. This is known in the art.

Given the density of the base stations, the sizes and shapes of the Voronoï polygons vary from one region to another of the network coverage area. They further depend on certain geographical criteria, and so some polygons can be derived from Voronoï polygons, modified to take account of those criteria.

Alternatively, the Voronoï polygons are replaced by another type of polygon representing the coverage area of the cell.

For each base station, and therefore for each associated Voronoï polygon, the data storage means 22 further contain one or more variables characteristic of the operation of the network, each variable advantageously being known at a plurality of successive times over the same time period, for example every hour over one day.

These characteristic variables include quality of service counters or indicators, logical state parameters, network design parameters, and parameters characteristic of the topology of the network, for example.

The quality of service indicators include the percentage of failed calls, for example, i.e. the number of calls sent from a base station or theoretically received by a base station that it has not been possible to connect through.

The characteristic variables further include the number per unit time of calls from or to a mobile station set up in each cell via the base station.

These characteristic variables are obtained from measurements carried out by the base stations and/or the mobile stations at regular intervals, the characteristic variables being transmitted over the network to the data storage means 22.

Figure 2:
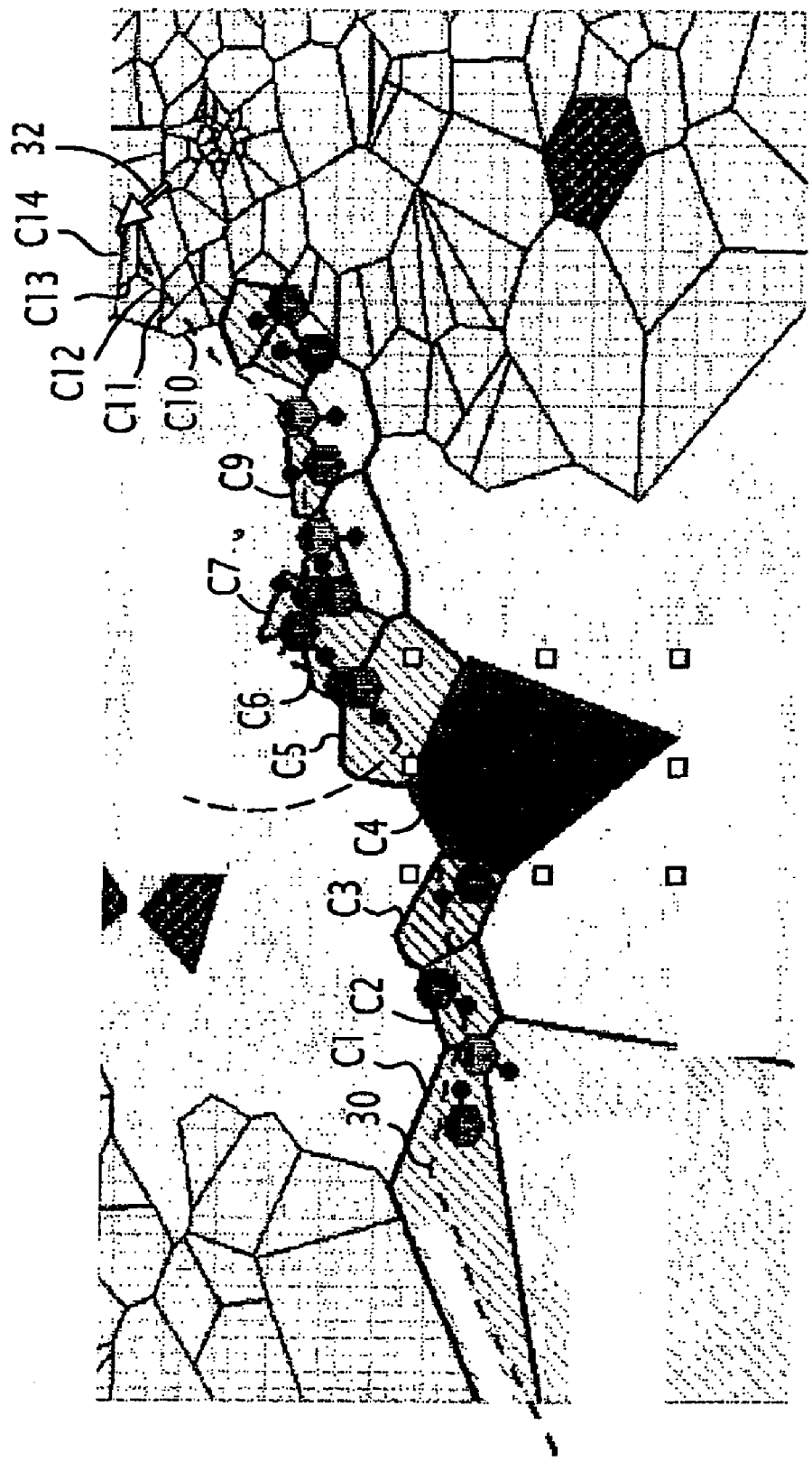
FIG. 2 is a diagrammatic view of an enlarged portion of a map displayed on the FIG. 1 workstation.

As shown in FIG. 2, the map of the network includes the contours of the Voronoï polygons in each cell. Each cell is filled by a pattern characteristic of the value of a variable characteristic of the operation of the network in the cell concerned.

Two or more of the characteristic variables of a cell are preferably shown on the map of the network, for example by means of a combination of colors and textures for each cell.

The colors and texture of each cell evolve over time as a function of variations of the associated characteristic values.

The man/machine interface of the workstation 10 includes means for selecting on the map of the network an observation line designated by the reference number 30 in FIG. 2. That observation line is designated "transect", for example.

A first embodiment of the station includes means for producing this line by moving a mobile cursor 32 over the screen, guided by the mouse 18.

In a different embodiment, the selection means are adapted to select a continuous line already existing on the map, such as a railway line, a road, a river or a boundary between two adjacent regions of the map.

The observation line 30 is a continuous line passing successively across adjacent cells designated by the references C1 to C14 in FIG. 2, for example. Thus the continuous line defines a succession of ordinates of adjacent cells selected because the observation line penetrates the Voronoï polygon associated with those cells.

In addition to the means for displaying the FIG. 2 map, the workstation 10 includes means for making available to the user a structured, for example graphical, representation of one or more characteristic variables for only the adjacent cells crossed by the observation line 30, for example by displaying that representation on the screen or printing it out on paper.

Figure 3:
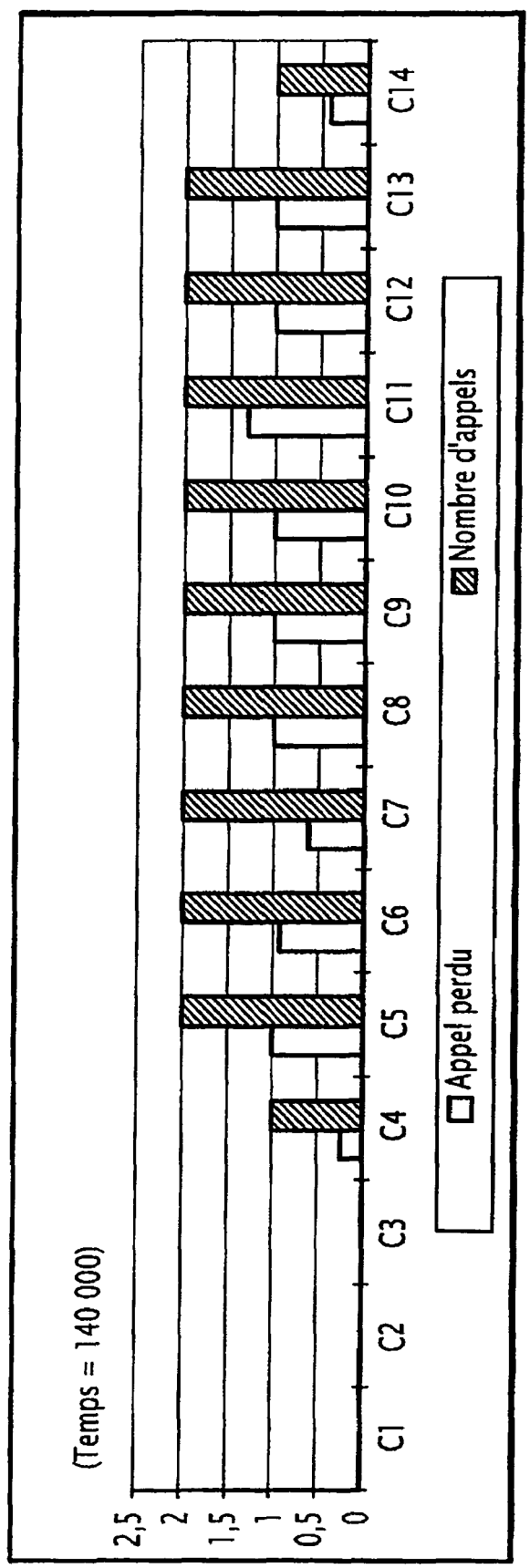
FIG. 3 is an example of a histogram of the values of two characteristic variables for cells along an observation line.

As shown in FIG. 3, the structured representation preferably takes the form of a histogram showing for each cell concerned, here the cells numbered C1 to C14, the values corresponding to one or more variables characteristic of each cell at the same given time.

In the present example, the histogram represents for each of the cells C1 to C14 at the same given time the number of lost calls, i.e. the number of calls sent to or received from the base station that have either been interrupted or have not been connected through. The number of lost calls is a characteristic variable representative of the quality of service provided to users.

The same histogram shows for each cell the number of calls received from or sent to the cell during a predetermined period.

If the data storage means 22 contain characteristic variables for each cell at a plurality of successive times, the workstation preferably includes means for showing the characteristic variables for each of the cells at those successive times based on the same FIG. 3 histogram, for example by successively displaying histograms for those successive times at the same place on the screen and using the same structured representation.

Figure 4:
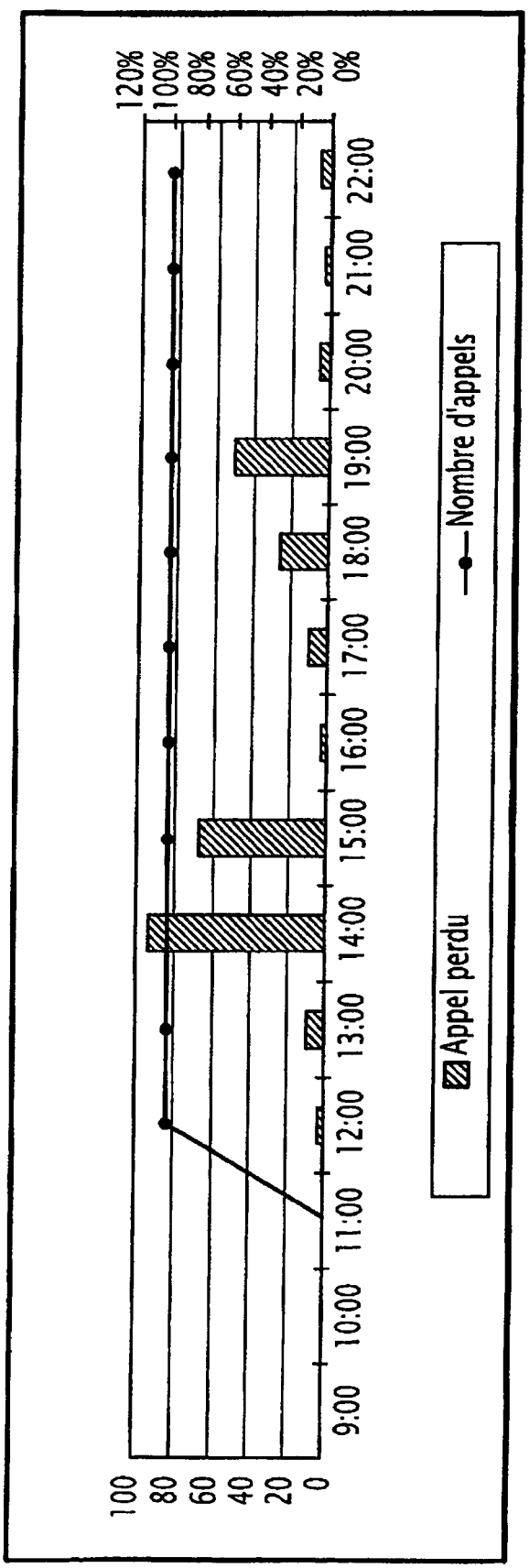
FIG. 4 is an example of a graphic showing the evolution over time of two variables characteristic of the operation of the network in a particular cell.

The workstation further includes means for selecting a particular one of the cells shown on the map represented in FIG. 2 and means for making available to the user a graphic like that shown in FIG. 4, showing the evolution over time of one or more characteristic variables for only the selected cell. In the present example, this graphic shows the number of lost calls for each hour and the number of calls received from or sent to the base station for each hour, here from 09h00 to 22h00.

It is found that with a base station of the above kind it is possible to analyze the operation of a cellular mobile telephone network on the basis of the operating states of only certain adjacent cells distributed along a predetermined observation line. This facilitates the work of the person optimizing the network since only a small quantity of information is presented simultaneously. Moreover, because that information corresponds to a particular observation line, it may be used to take account of the particular operation of the network along a road, a railway or any other line of the network.

What is claimed is:

1. A method of analyzing the operation of a cellular mobile telecommunications network comprising a set of cells each associated with a base station adapted to communicate with a mobile station present in the cell, the method comprising the following steps:
   a) for each cell, collecting one or more characteristic variables from measurements carried out by at least one of the corresponding base station and the mobile station, the one or more characteristic variables relating to the operation of the cellular mobile telecommunications network in said cell; and
   b) supplying each characteristic variable in association with the collection cell to facilitate optimization of a configuration for the cellular mobile telecommunications network, the supplying comprising:
      b1) selecting, on a map of the cellular mobile telecommunications network based on said cells, an observation line passing over the map across adjacent cells; and
      b2) making available, on said map, a structured representation of each characteristic variable for the adjacent cells crossed by said observation line in the order in which they are encountered along said line for analysis of operation of the cellular mobile telecommunications network;
   wherein the collecting in a) includes sampling the characteristic variables over time and the making available in b2) includes making successively available the same structured representation of each characteristic variable at successive sampling times.

2. A method according to claim 1 wherein two or more characteristic variables are collected for each cell and made available simultaneously in the same structured representation.

3. A method according to claim 1 wherein said structured representation includes a bidimensional graphic one dimension whereof represents adjacent cells of said line and the other dimension whereof represents the or each characteristic variable.

4. A non-transitory computer readable medium encoded with a computer program that can be executed by a computer including means for making available information including a set of instructions for executing steps of the method according to claim 1 when said computer program is executed by a workstation.

5. The method of claim 1, the one or more characteristic variables comprising at least one characteristic variable relating to quality of service (QoS) provided to users by the cellular mobile telecommunications network.

6. The method of claim 5, the at least one characteristic variable relating to QoS comprising at least one of a QoS counter, a QoS indicator, and a number of lost calls.

7. The method of claim 1, the one or more characteristic variables comprising logical state parameters relating to operation of the cellular mobile telecommunications network.

8. The method of claim 1, the one or more characteristic variables comprising network design parameters relating to operation of the cellular mobile telecommunications network.

9. The method of claim 1, the one or more characteristic variables comprising parameters relating to topology of the cellular mobile telecommunications network.

10. The method of claim 1, the one or more characteristic variables comprising calls from the mobile station per a first predetermined unit time and calls to the mobile station per a second predetermined unit time.

11. A workstation for analyzing the operation of a cellular mobile telecommunications network including a set of cells each associated with a base station adapted to communicate with a mobile station present in the cell, the workstation including:
   a) collector means for collecting, for each cell, one or more characteristic variables from measurements carried out by at least one of the corresponding base station and the mobile station, the one or more characteristic variables relating to the operation of the cellular mobile telecommunications network in said cell, the collector means comprising;
      a1) means for sampling each characteristic variable over time; and
   b) supply means for supplying each characteristic variable in association with the collection cell to facilitate optimization of a configuration for the cellular mobile telecommunications network, the supply means comprising:
      b1) means for selecting, on a map of the cellular mobile telecommunications network based on said cells, an observation line passing over the map across adjacent cells;
      b2) means for making available, on said map, a structured representation of each characteristic variable for the adjacent cells crossed by said observation line in the order in which they are encountered along said line for analysis of operation of the cellular mobile telecommunications network;
      b3) means for selecting a single analysis cell; and
      b4) means for making a structured representation of the evolution over time of one or more characteristic variable for the selected analysis cell.

12. The workstation of claim 11, the one or more characteristic variables comprising at least one characteristic variable relating to quality of service (QoS) provided to users by the cellular mobile telecommunications network, logical state parameters relating to operation of the cellular mobile telecommunications network, network design parameters relating to operation of the cellular mobile telecommunications network, and topology of the cellular mobile telecommunications network.

13. The workstation of claim 11, the one or more characteristic variables comprising at least one characteristic variable relating to a quality of service (QoS) counter, a QoS indicator, a number of lost calls per a first predetermined unit time, calls from the mobile station per a second predetermined unit time, and calls to the mobile station per a third predetermined unit time.

14. A method of analyzing operation of a mobile telecommunications network, comprising:
   a) for each cell of a set of cells relating to a corresponding set of base stations, collecting a characteristic variable relating to operation of the mobile telecommunications network in the corresponding cell, wherein the set of base stations form a coverage area for the mobile telecommunications network and each base station is adapted to communicate with a mobile station present in the corresponding cell, the characteristic variable collected from measurements carried out by at least one of the corresponding base station and the mobile station, the collecting comprising:

a1) sampling the characteristic variables over time; and b) supplying the collected characteristic variables for a succession of adjacent cells to an operator to facilitate optimization of a configuration for the mobile telecommunications network, the supplying comprising:

b1) selecting an observation line on a map of the coverage area formed by the set of cells, wherein the line passes through the succession of adjacent cells; and b2) providing a structured representation of the collected characteristic variables for the succession of adjacent cells through which the observation line passes on the map for analysis of operation of the mobile telecommunications network, wherein the structured representation is arranged in the order in which the succession of adjacent cells are encountered along the observation line; and b3) providing successive structured representations of the collected characteristic variables over time for the selected observation line in relation to the corresponding sampling in a1) in conjunction with the analysis of operation of the mobile telecommunications network.

15. The method of claim 14 wherein two or more characteristic variables are collected for each cell and provided in the same structured representation.

16. The method of claim 14 wherein the structured representation includes a bidimensional graphic, one dimension representing the succession of adjacent cells associated with the observation line and the other dimension representing the characteristic variable.

17. The method of claim 14, further comprising:
    selecting a single analysis cell; and
    making a structured representation of the evolution of the characteristic variable over time for the selected analysis cell.

18. The method of claim 14, the one or more characteristic variables comprising at least one characteristic variable relating to quality of service (QoS) provided to users by the cellular mobile telecommunications network, a QoS counter, a QoS indicator, a number of lost calls per a first predetermined unit time, logical state parameters relating to operation of the cellular mobile telecommunications network, network design parameters relating to operation of the cellular mobile telecommunications network, topology of the cellular mobile telecommunications network, calls from the mobile station per a second predetermined unit time, and calls to the mobile station per a third predetermined unit time.

* * * * *